United States Patent
Shrestha et al.

(10) Patent No.: US 11,617,215 B2
(45) Date of Patent: Mar. 28, 2023

(54) INITIATING RANDOM ACCESS IN A TARGET CELL IN A NON-TERRESTRIAL NETWORK

(71) Applicant: QUALCOMM Incorporated, San Diego, CA (US)

(72) Inventors: Bharat Shrestha, San Diego, CA (US); Umesh Phuyal, San Diego, CA (US); Ayan Sengupta, San Diego, CA (US); Alberto Rico Alvarino, San Diego, CA (US); Liangping Ma, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,154

(22) Filed: Jul. 21, 2021

(65) Prior Publication Data
US 2023/0023214 A1 Jan. 26, 2023

(51) Int. Cl.
| | | |
|---|---|---|
| *H04W 56/00* | (2009.01) | |
| *H04W 74/08* | (2009.01) | |
| *H04W 74/00* | (2009.01) | |
| *H04W 36/00* | (2009.01) | |
| *H04W 24/08* | (2009.01) | |
| *H04W 84/06* | (2009.01) | |

(52) U.S. Cl.
CPC ....... *H04W 74/0841* (2013.01); *H04W 24/08* (2013.01); *H04W 36/00837* (2018.08); *H04W 74/006* (2013.01); *H04W 84/06* (2013.01)

(58) Field of Classification Search
CPC .............. H04B 7/18513; H04B 7/1851; H04B 7/18504; H04W 56/0045; H04W 56/0005; H04W 74/0833; H04W 48/12; H04W 84/06; H04W 88/06; H04W 48/20; H04W 72/0433; H04W 72/0453; H04W 48/16
See application file for complete search history.

(56) References Cited

U.S. PATENT DOCUMENTS

| | | | |
|---|---|---|---|
| 2020/0351957 A1* | 11/2020 | Kim ................... | H04W 74/0866 |
| 2021/0029658 A1* | 1/2021 | Mahalingam ...... | H04B 7/18513 |
| 2021/0168683 A1* | 6/2021 | Peisa ..................... | H04W 36/06 |
| 2021/0219228 A1* | 7/2021 | Matsuda ............... | H04W 48/12 |
| 2021/0377825 A1* | 12/2021 | Deenoo ............. | H04B 7/18513 |
| 2022/0225195 A1* | 7/2022 | Park ................... | H04W 36/0058 |

* cited by examiner

*Primary Examiner* — Jung Liu
(74) *Attorney, Agent, or Firm* — Harrity & Harrity, LLP

(57) ABSTRACT

Various aspects described herein relate to dynamically controlling a time when random access initiated in a target cell of a non-terrestrial network. For example, when a user equipment (UE) detects an event that triggers a random access procedure in the target cell, the UE may monitor a control channel from the target cell for a control signal during a target cell monitoring window prior to initiating random access in the target cell. For example, the control signal may include a dynamic indication to identify UEs allowed to initiate random access, whereby a UE is not permitted to autonomously start contention-based random access in the target cell during the target cell monitoring window unless the UE has received the control signal. In this way, the target cell may regulate a rate at which UEs initiate the RACH procedure in order to manage congestion in the target cell.

30 Claims, 11 Drawing Sheets

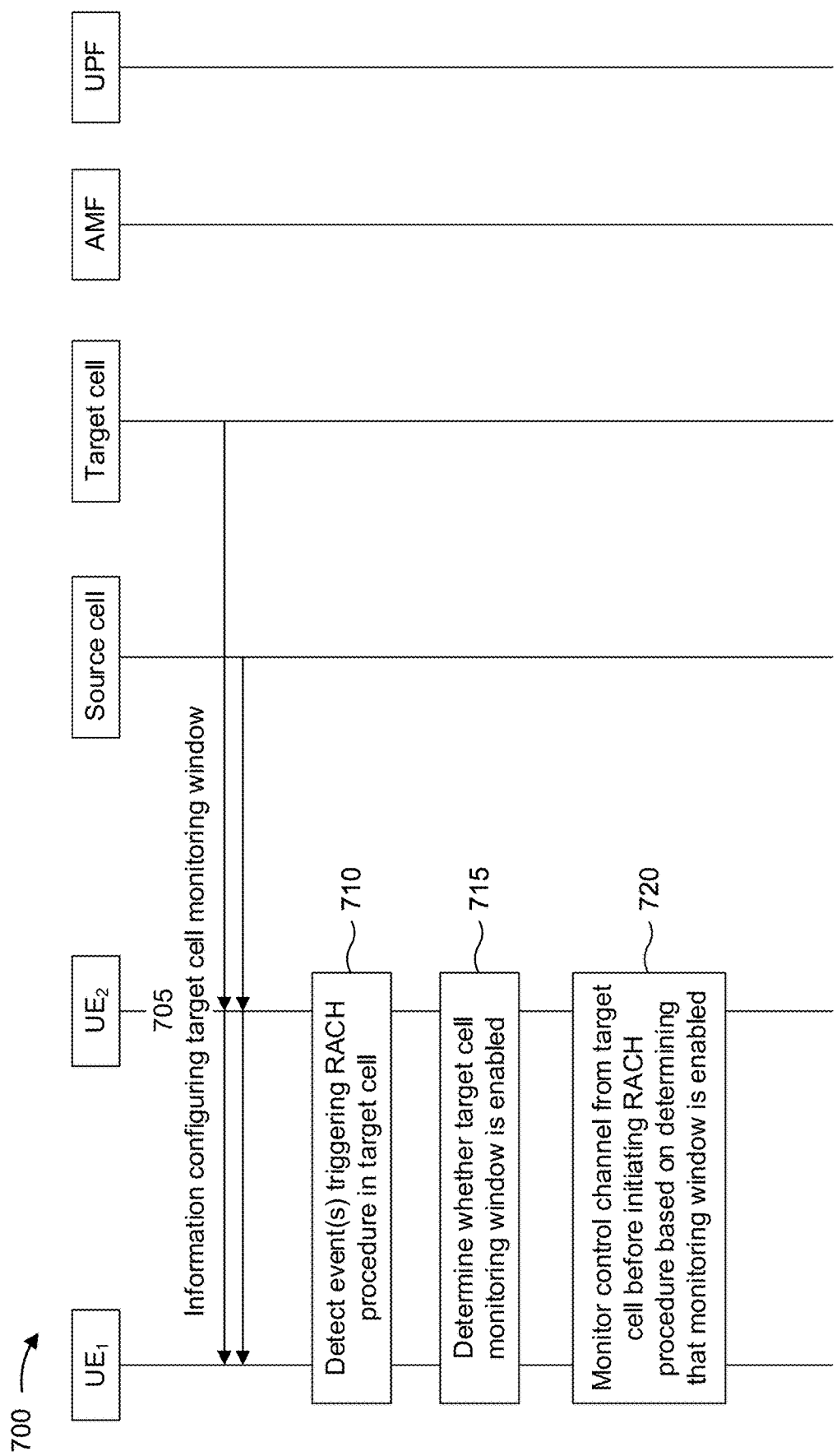

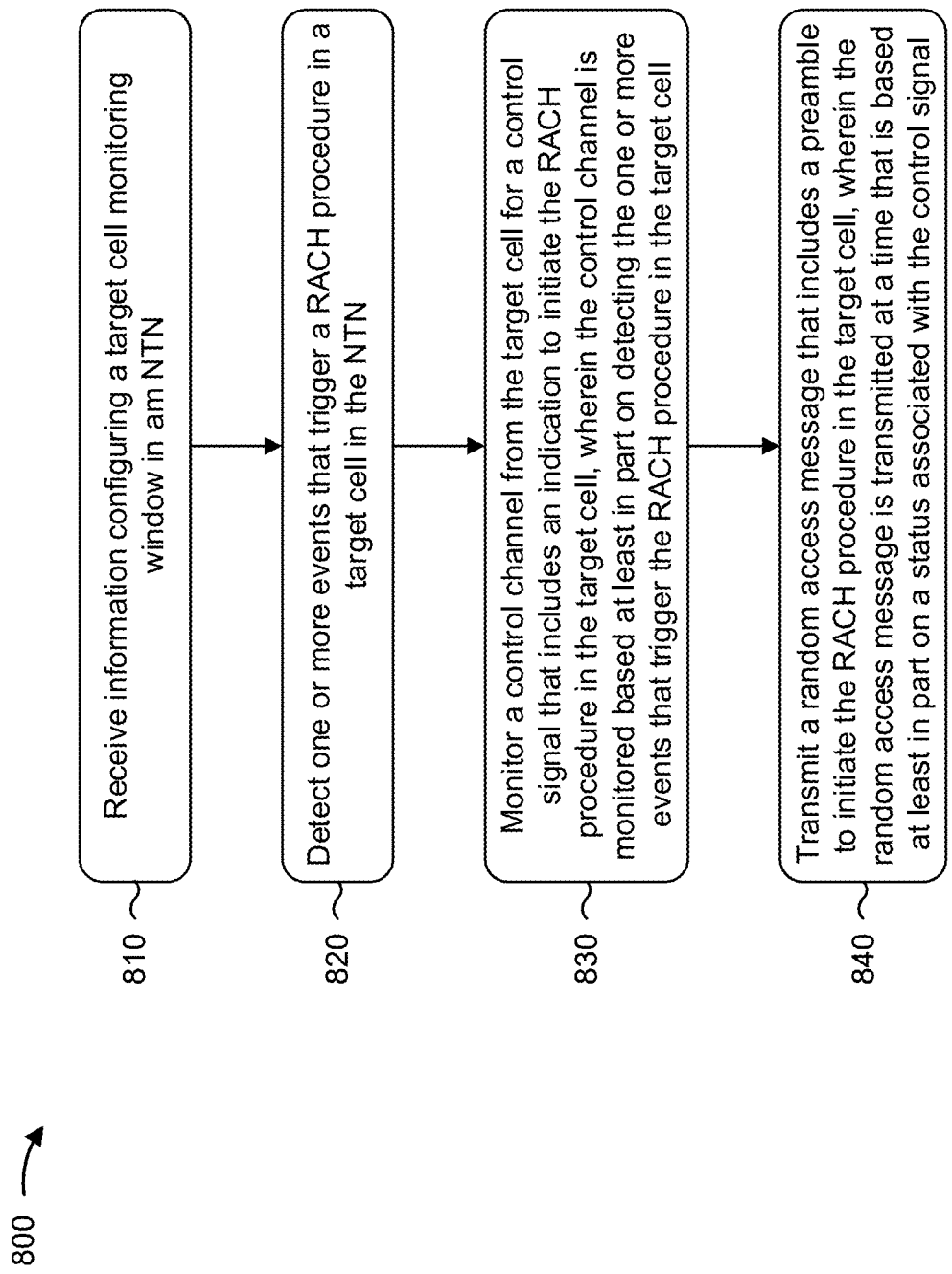

INITIATING RANDOM ACCESS IN A TARGET CELL IN A NON-TERRESTRIAL NETWORK

FIELD OF THE DISCLOSURE

Aspects of the present disclosure generally relate to wireless communication and to techniques and apparatuses associated with initiating random access in a target cell in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

In a non-terrestrial network (NTN), there are various scenarios in which a user equipment (UE) may initiate a random access channel (RACH) procedure in a target cell in order to synchronize with the target cell and an establish an initial radio resource control (RRC) connection. For example, in a transparent deployment where a satellite communicates with various UEs using a service link and with a base station using a feeder link, the satellite may need to switch the feeder link due to movement of the satellite or because the base station associated with the active feeder link is switched off, among other examples. Accordingly, all of the UEs served by the satellite may need to be handed over from a source cell provided by a first base station to a target cell provided by a second base station, which can result in significant congestion in the target cell provided by the second base station (e.g., when the satellite is serving a large number of UEs that need to be handed over to the target cell at or around the same time). In such cases, the congestion in the target cell may cause the RACH procedure to fail for one or more UEs attempting to connect to the target cell and/or degrade performance for one or more UEs that are connected to the target cell, among other examples.

Additionally, or alternatively, other scenarios may cause congestion to occur in the target cell due to many UEs initiating a RACH procedure at or around the same time. For example, in an NTN, one or more cells may be switched off or otherwise deactivated and a new cell may be activated to take over communication for the deactivated cell(s). In such cases, multiple UEs may attempt to connect to the target cell at or around the same time, for example, to perform an RRC reestablishment procedure in the target cell, transmit a handover completion message (e.g., an RRC reconfiguration complete message) to the target cell, and/or perform a registration update (e.g., when a gateway is switched and/or a tracking area or public land mobile network (PLMN) changes for UEs operating in an idle mode, among other examples). Accordingly, in cases where multiple UEs initiate a RACH procedure in a target cell at or around the same time, high congestion may occur in the target cell, which may result in RACH failure for one or more UEs attempting to connect (or reconnect) to the target cell and/or radio link failure for one or more UEs that are connected to the target cell.

Some aspects described herein relate to techniques and apparatuses to dynamically control a time when a RACH procedure is performed in a target cell (e.g., when a handover command is executed because a source cell is switched off or a satellite needs to switch a feeder link from the source cell to the target cell, when an RRC reestablishment procedure is triggered for a UE communicating in the target cell, and/or a registration update is triggered due to a tracking area update and/or a change to a gateway or PLMN for UEs operating in idle mode). For example, as described in further detail herein, a UE may receive information (e.g., UE-specific, group-specific, and/or cell-specific signaling) that configures a target cell monitoring window in an NTN, and the UE may monitor a control channel for a control signal from the target cell during the target cell monitoring window prior to initiating a RACH procedure in the target cell. For example, in some aspects, the control signal may include a dynamic indication to identify one or more UEs (e.g., a group of UEs) allowed to initiate random access, whereby a UE is not permitted to autonomously start a contention-based RACH procedure in the target cell during the target cell monitoring window unless the UE has received the control signal indicating that the UE is allowed to initiate random access. In this way, the target cell may regulate a rate at which UEs initiate the RACH procedure in order to manage congestion in the target cell. Furthermore, in cases where the UE does not receive the control signal during the target cell monitoring window, the UE may be permitted to autonomously initiate random access after the target cell monitoring window has expired. Additionally, or alternatively, a UE that is provided with a contention-free physical RACH (PRACH) resource (e.g., prior to or during the target cell monitoring window) may ignore the target cell monitoring window and initiate a RACH procedure at any suitable time using the contention-free PRACH resource.

Some aspects described herein relate to a method of wireless communication performed by a UE. The method may include receiving information configuring a target cell monitoring window in an NTN. The method may include detecting one or more events that trigger a RACH procedure in a target cell in the NTN. The method may include monitoring a control channel from the target cell for a control signal that includes an indication to initiate the RACH procedure in the target cell, wherein the control channel is monitored based at least in part on detecting the one or more events that trigger the RACH procedure in the target cell. The method may include transmitting a random access message that includes a preamble to initiate the RACH procedure in the target cell, wherein the random access message is transmitted at a time that is based at least in part on a status associated with the control signal.

Some aspects described herein relate to a UE for wireless communication. The UE may include a memory and one or more processors coupled to the memory. The one or more processors may be configured to receive information configuring a target cell monitoring window in an NTN. The one or more processors may be configured to detect one or more events that trigger a RACH procedure in a target cell in the NTN. The one or more processors may be configured to monitor a control channel from the target cell for a control signal that includes an indication to initiate the RACH procedure in the target cell, wherein the control channel is monitored based at least in part on detecting the one or more events that trigger the RACH procedure in the target cell. The one or more processors may be configured to transmit a random access message that includes a preamble to initiate the RACH procedure in the target cell, wherein the random access message is transmitted at a time that is based at least in part on a status associated with the control signal.

Some aspects described herein relate to a non-transitory computer-readable medium that stores a set of instructions for wireless communication by a UE. The set of instructions, when executed by one or more processors of the UE, may cause the UE to receive information configuring a target cell monitoring window in an NTN. The set of instructions, when executed by one or more processors of the UE, may cause the UE to detect one or more events that trigger a RACH procedure in a target cell in the NTN. The set of instructions, when executed by one or more processors of the UE, may cause the UE to monitor a control channel from the target cell for a control signal that includes an indication to initiate the RACH procedure in the target cell, wherein the control channel is monitored based at least in part on detecting the one or more events that trigger the RACH procedure in the target cell. The set of instructions, when executed by one or more processors of the UE, may cause the UE to transmit a random access message that includes a preamble to initiate the RACH procedure in the target cell, wherein the random access message is transmitted at a time that is based at least in part on a status associated with the control signal.

Some aspects described herein relate to an apparatus for wireless communication. The apparatus may include means for receiving information configuring a target cell monitoring window in an NTN. The apparatus may include means for detecting one or more events that trigger a RACH procedure in a target cell in the NTN. The apparatus may include means for monitoring a control channel from the target cell for a control signal that includes an indication to initiate the RACH procedure in the target cell, wherein the control channel is monitored based at least in part on detecting the one or more events that trigger the RACH procedure in the target cell. The apparatus may include means for transmitting a random access message that includes a preamble to initiate the RACH procedure in the target cell, wherein the random access message is transmitted at a time that is based at least in part on a status associated with the control signal.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 7A-7B are diagrams illustrating examples associated with initiating random access in a target cell in an NTN.

FIG. 8 is a flowchart of an example method of wireless communication.

DETAILED DESCRIPTION

Figure 1:
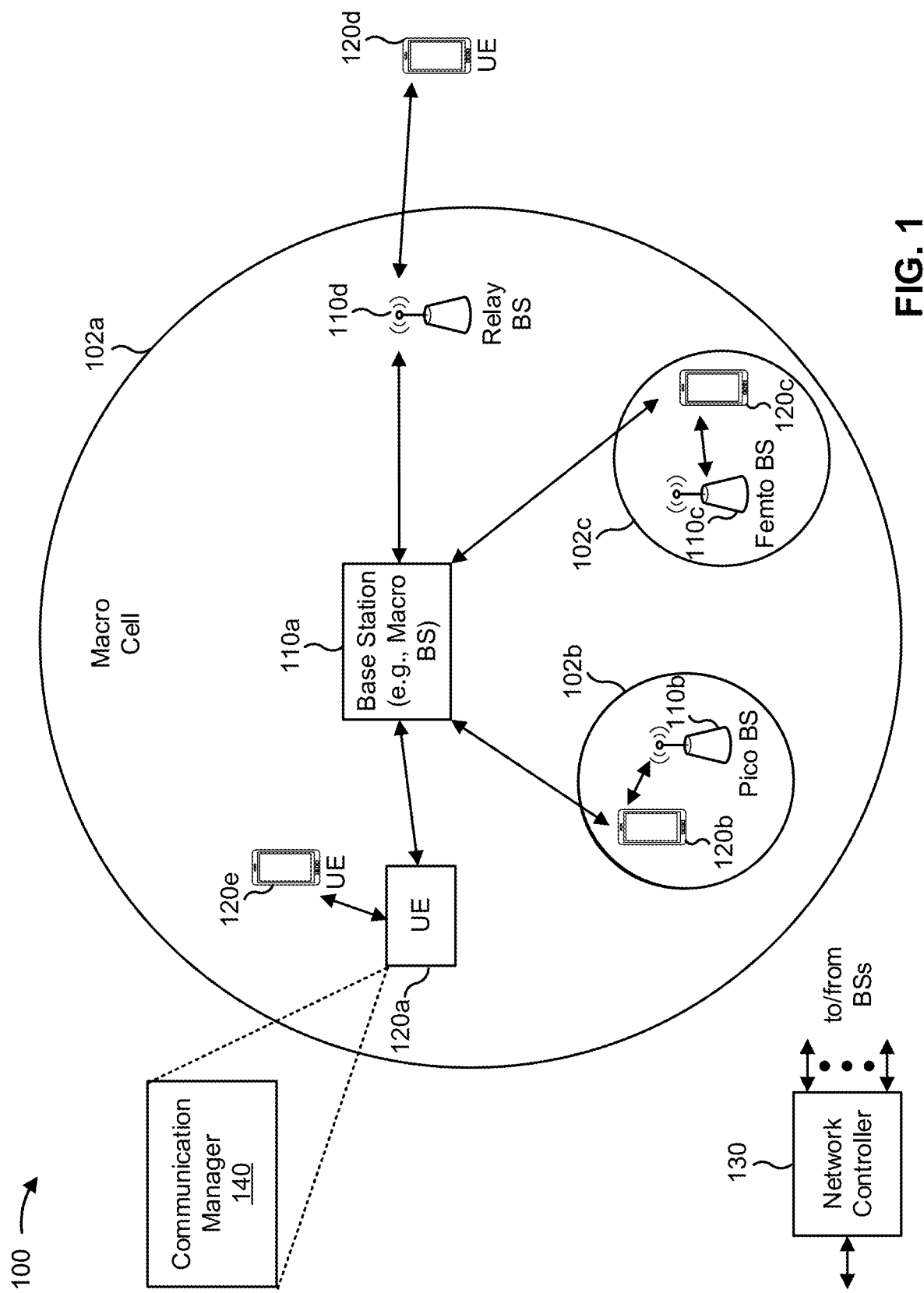
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information configuring a target cell monitoring window in a non-terrestrial network (NTN); detect one or more events that trigger a random access channel (RACH) procedure in a target cell in the NTN; monitor a control channel from the target cell for a control signal that includes an indication to initiate the RACH procedure in the target cell, wherein the control channel is monitored based at least in part on detecting the one or more events that trigger the RACH procedure in the target cell; and transmit a random access message that includes a preamble to initiate the RACH procedure in the target cell, wherein the random access message is transmitted at a time that is based at least in part on a status associated with the control signal. Additionally, or alternatively, the communication manager 140 may perform one or more other operations described herein.

As indicated above, FIG. 1 is provided as an example. Other examples may differ from what is described with regard to FIG. 1.

Figure 2:
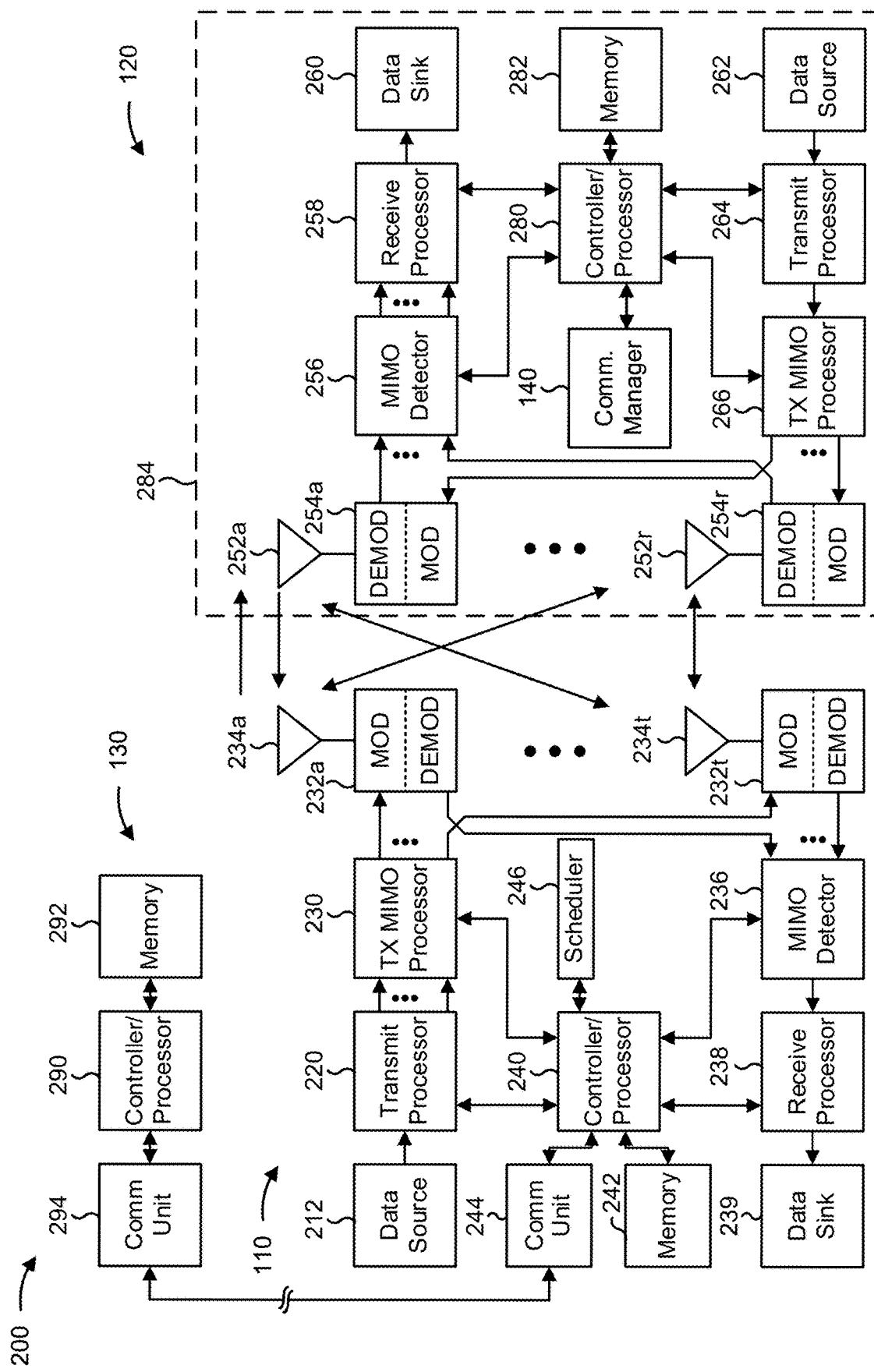
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with initiating random access in a non-terrestrial network (NTN), as described in more detail elsewhere herein. For example, the controller/processor 240 of the base station 110, the controller/processor 280 of the UE 120, and/or any other component(s) of FIG. 2 may perform or direct operations of, for example, method 800 of FIG. 8 and/or other methods as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 800 of FIG. 8 and/or other processes as described herein. In some examples, executing instructions may include running the instructions, converting the instructions, compiling the instructions, and/or interpreting the instructions, among other examples.

In some aspects, the UE 120 includes means for receiving information configuring a target cell monitoring window in an NTN; means for detecting one or more events that trigger a random access channel (RACH) procedure in a target cell in the NTN; means for monitoring a control channel from the target cell for a control signal that includes an indication to initiate the RACH procedure in the target cell, wherein the control channel is monitored based at least in part on detecting the one or more events that trigger the RACH procedure in the target cell; and/or means for transmitting a random access message that includes a preamble to initiate the RACH procedure in the target cell, wherein the random access message is transmitted at a time that is based at least in part on a status associated with the control signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
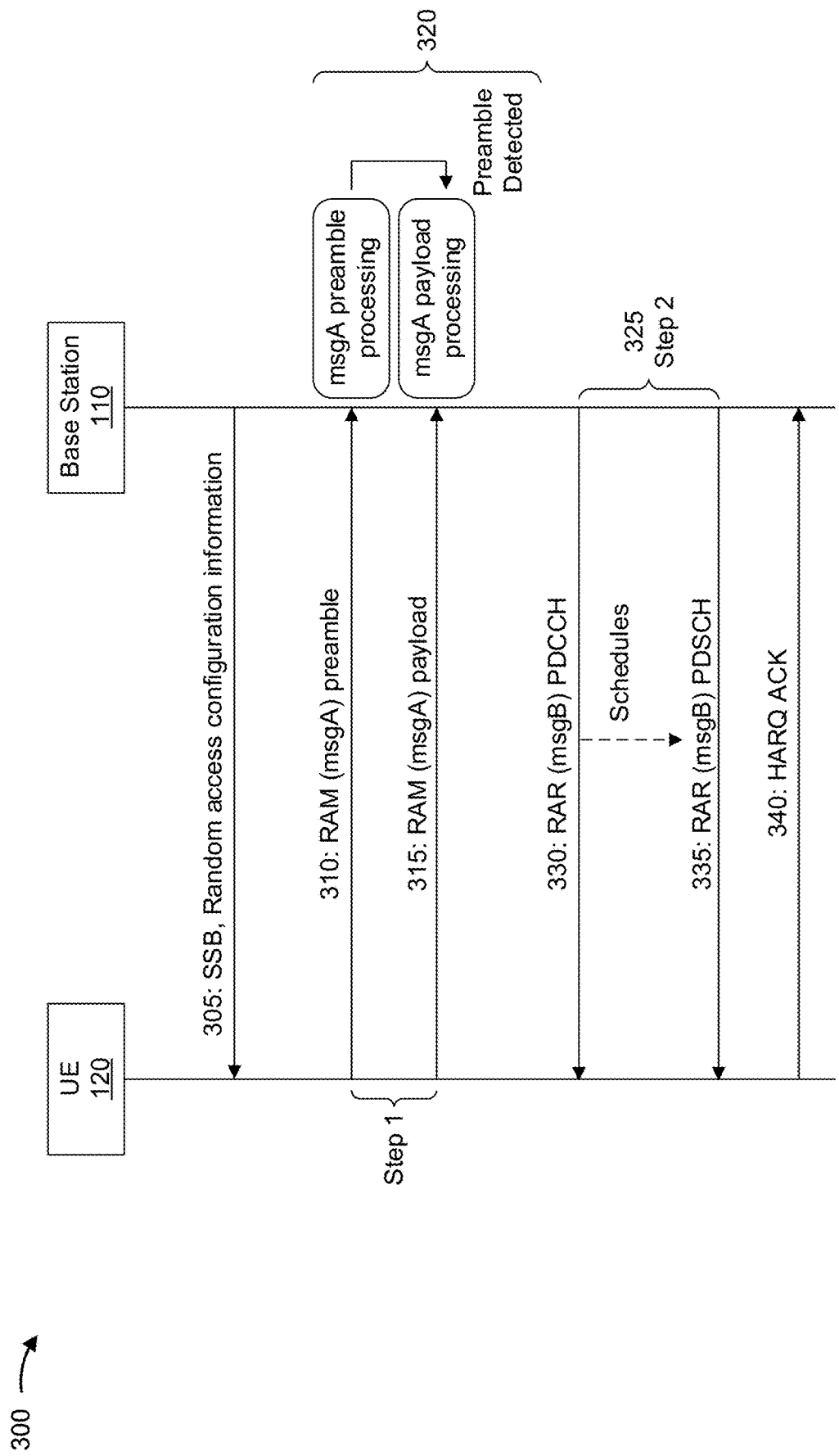
FIG. 3 is a diagram illustrating an example of a two-step random access channel (RACH) procedure.

FIG. 3 is a diagram illustrating an example 300 of a two-step random access channel (RACH) procedure.

As shown at 305, the base station 110 may transmit, and the UE 120 may receive, one or more synchronization signal blocks (SSBs) and random access configuration information. The random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step RACH procedure, such as one or more parameters for transmitting a random access message (RAM) and/or receiving a random access response (RAR) to the RAM.

As shown at 310, the UE 120 may transmit, and the base station 110 may receive, a RAM preamble. As shown at 315, the UE 120 may transmit, and the base station 110 may receive, a RAM payload. As shown, the UE 120 may transmit the RAM preamble and the RAM payload to the base station 110 as part of an initial (or first) step of the two-step RACH procedure. The RAM may be referred to as message A, msgA, a first message, or an initial message in a two-step RACH procedure. Furthermore, the RAM preamble may be referred to as a message A preamble, a msgA preamble, a preamble, or a physical random access channel (PRACH) preamble, and the RAM payload may be referred to as a message A payload, a msgA payload, or a payload. The RAM may include some or all of the contents of message 1 (msg1) and message 3 (msg3) of a four-step RACH procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown at 320, the base station 110 may receive the RAM preamble transmitted by the UE 120. If the base station 110 successfully receives and decodes the RAM preamble, the base station 110 may then receive and decode the RAM payload.

As shown at 325, the base station 110 may transmit an RAR (sometimes referred to as an RAR message). As shown, the base station 110 may transmit the RAR message as part of a second step of the two-step RACH procedure. The RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, a timing advance value, and/or contention resolution information.

As shown at 330, as part of the second step of the two-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown at 335, as part of the second step of the two-step RACH procedure, the base station 110 may transmit the PDSCH communication for the RAR, as scheduled by the PDCCH communication. The RAR may be included in a medium access control (MAC) protocol data unit (PDU) of the PDSCH communication. As shown at 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
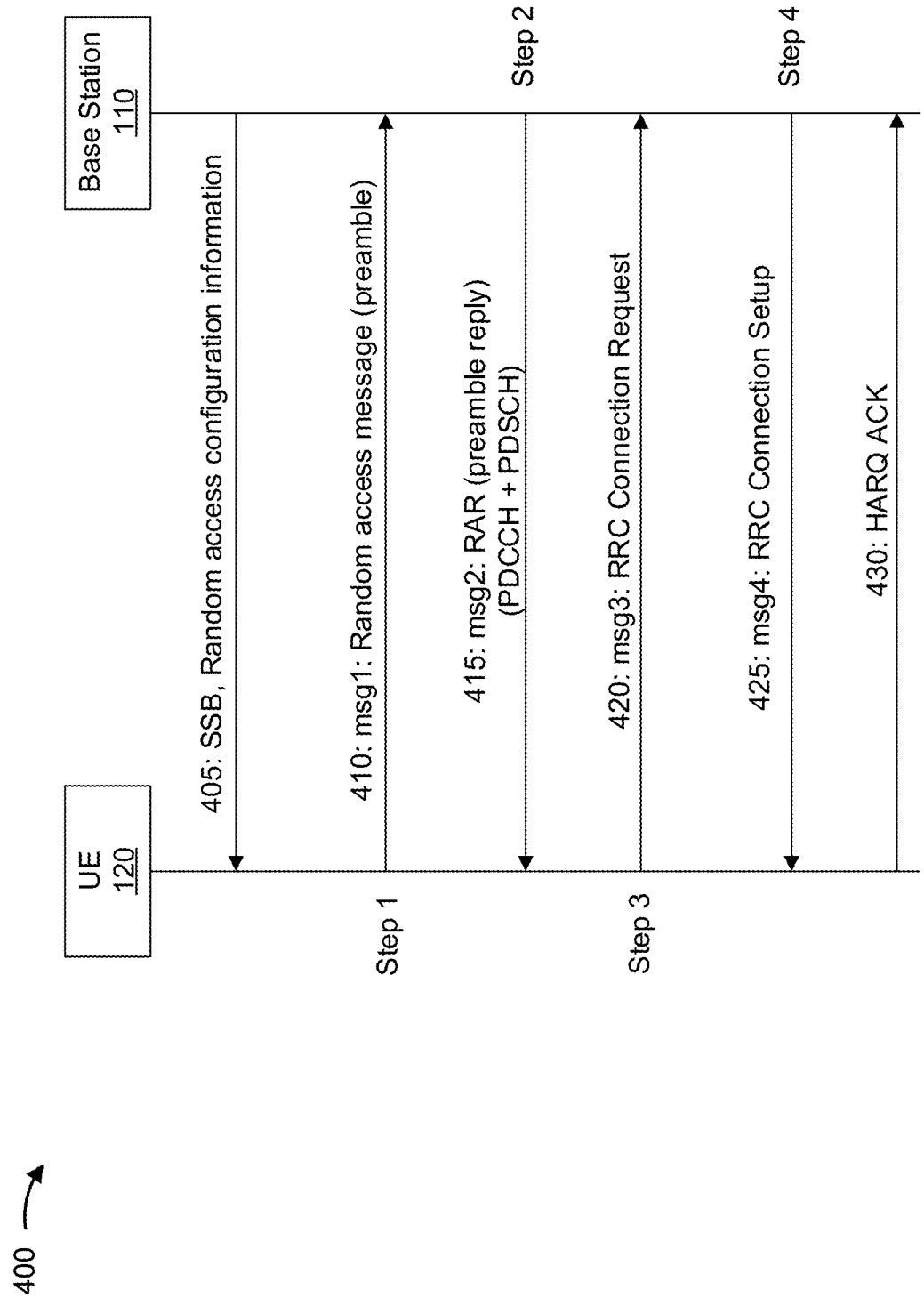
FIG. 4 is a diagram illustrating an example of a four-step RACH procedure.

FIG. 4 is a diagram illustrating an example 400 of a four-step RACH procedure. As shown in FIG. 4, a base station 110 and a UE 120 may communicate with one another to perform the four-step RACH procedure.

As shown at 405, the base station 110 may transmit, and the UE 120 may receive, one or more SSBs and random access configuration information. The random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the four-step RACH procedure, such as one or more parameters for transmitting a RAM and/or one or more parameters for receiving an RAR.

As shown at 410, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step RACH procedure. The random access message may include a random access preamble identifier.

As shown at 415, the base station 110 may transmit an RAR as a reply to the preamble. The message that includes the RAR may be referred to as message 2, msg2, MSG2, or a second message in a four-step RACH procedure. The RAR may indicate the detected random access preamble identifier (e.g., received from the UE 120 in msg1). Additionally, or alternatively, the RAR may indicate a resource allocation to be used by the UE 120 to transmit message 3 (msg3).

As part of the second step of the four-step RACH procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a MAC PDU of the PDSCH communication.

As shown at 420, the UE 120 may transmit an RRC connection request message. The RRC connection request message may be referred to as message 3, msg3, MSG3, or a third message of a four-step RACH procedure. The RRC connection request may include a UE identifier, UCI, and/or a PUSCH communication (e.g., an RRC connection request).

As shown at 425, the base station 110 may transmit an RRC connection setup message. The RRC connection setup message may be referred to as message 4, msg4, MSG4, or a fourth message of a four-step RACH procedure. The RRC connection setup message may include the detected UE identifier, a timing advance value, and/or contention resolution information. As shown at 430, if the UE 120 successfully receives the RRC connection setup message, the UE 120 may transmit a HARQ ACK.

As indicated above, FIG. 4 is provided as an example. Other examples may differ from what is described with regard to FIG. 4.

Figure 5:
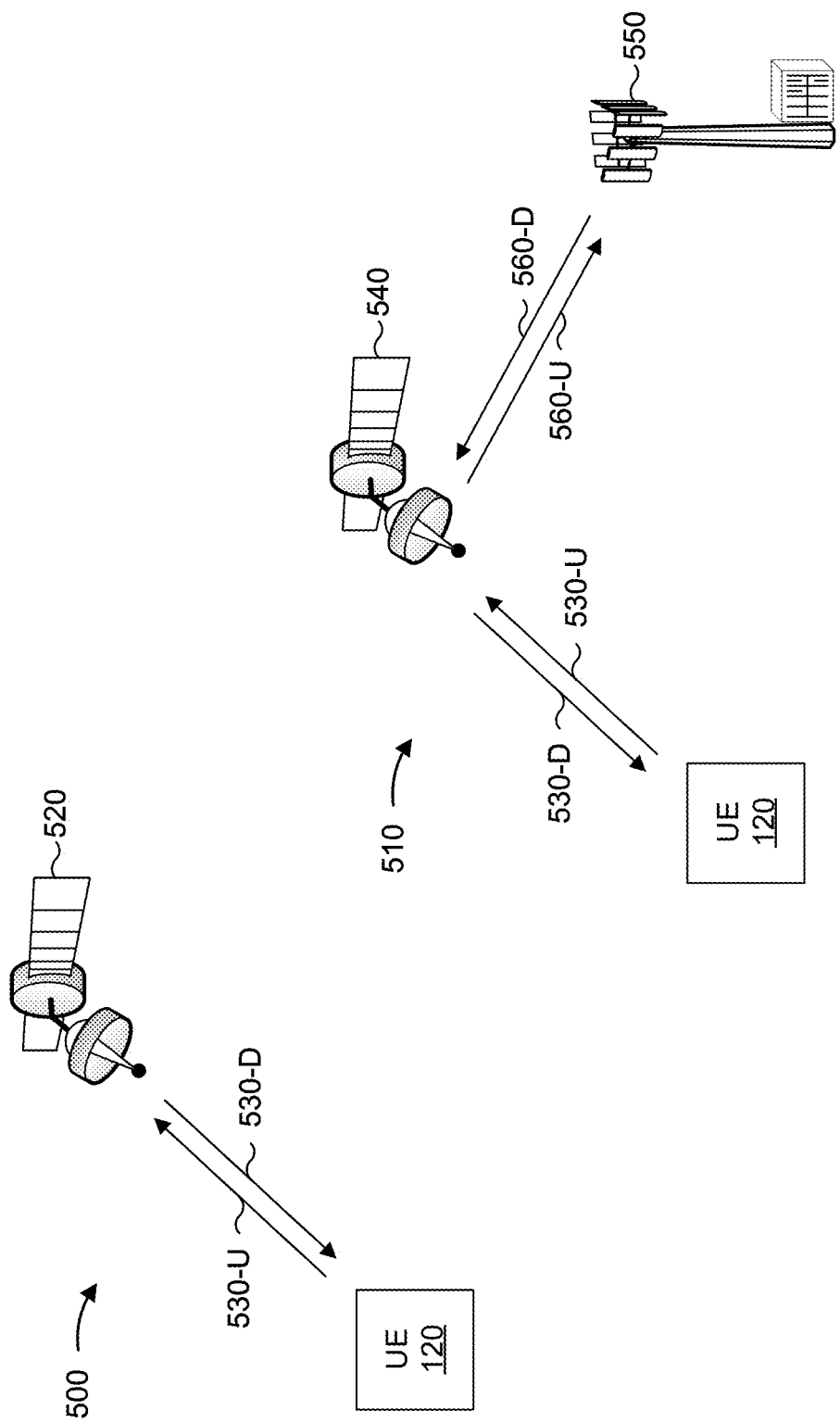
FIG. 5 is a diagram illustrating an example of a regenerative satellite deployment and an example of a transparent satellite deployment in a non-terrestrial network (NTN).

FIG. 5 is a diagram illustrating an example 500 of a regenerative satellite deployment and an example 510 of a transparent satellite deployment in a non-terrestrial network (NTN).

Example 500 shows a regenerative satellite deployment in an NTN. In example 500, a UE 120 is served by a satellite 520 via a service link 530. For example, the satellite 520 may include a base station 110 (e.g., base station 110*a*) and/or a gNB. The satellite 520 may be referred to as a non-terrestrial base station, a regenerative repeater, and/or an on-board processing repeater, among other examples. The satellite 520 may demodulate an uplink radio frequency (RF) signal, and may modulate a baseband signal derived from the uplink RF signal to produce a downlink RF transmission. The satellite 520 may transmit the downlink RF signal to the UE 120 on the service link 530. The satellite 520 may provide a cell that covers the UE 120.

Example 510 shows a transparent satellite deployment, which may also be referred to as a bent-pipe satellite deployment. In example 510, a UE 120 is served by a satellite 540 via the service link 530. The satellite 540 may be a transparent satellite. The satellite 540 may relay a signal received from a gateway 550 via a feeder link 560. For example, the satellite 540 may receive an RF transmission from the gateway 550 via the feeder link 560, and may relay the RF transmission to the UE 120 via the service link 530 without demodulating the RF transmission. Additionally, or alternatively, the satellite 540 may receive an RF transmission from the UE 120 via the service link 530 and may relay the RF transmission to the gateway 550 via the feeder link 560 without demodulating the RF transmission. The satellite 540 may frequency convert the RF transmission(s) received on the service link 530 to a frequency of the RF transmission(s) on the feeder link 560 (or vice versa), and may amplify and/or filter the relayed RF transmission(s). The UEs 120 shown in example 500 and example 510 may be associated with a Global Navigation Satellite System (GNSS) capability or a Global Positioning System (GPS) capability, though not all UEs have such capabilities. The satellite 540 may provide a cell that covers the UE 120.

As shown in FIG. 5, the service link 530 may include a link between the satellite 540 and the UE 120, and may include one or more of an uplink or a downlink. The feeder link 560 may include a link between the satellite 540 and the gateway 550, and may include one or more of an uplink (e.g., from the UE 120 to the gateway 550) or a downlink (e.g., from the gateway 550 to the UE 120). As shown in FIG. 5, an uplink of the service link 530 is indicated by reference number 530-U and a downlink of the service link 530 is indicated by reference number 530-D. Similarly, an uplink of the feeder link 560 is indicated by reference number 560-U and a downlink of the feeder link 560 is indicated by reference number 560-D.

The feeder link 560 and the service link 530 may each experience Doppler effects due to the movement of the satellites 520 and 540, and potentially movement of a UE 120. The Doppler effects may be significantly larger than in a terrestrial network. The Doppler effect on the feeder link 560 may be compensated for to some degree, but may still be associated with some amount of uncompensated frequency error. Furthermore, the gateway 550 may be associated with a residual frequency error, and/or the satellite 520/540 may be associated with an on-board frequency error. These sources of frequency error may cause a received downlink frequency at the UE 120 to drift from a target downlink frequency. Furthermore, due to the long distance between the UE 120 and satellite 520/540, communication in an NTN may be associated with a much longer delay (e.g., a longer latency and/or a longer round trip time) than a delay associated with a terrestrial network. The delay may be even greater in a transparent satellite deployment, because any communication between the UE 120 and the gateway 550 must travel over the service link 530 and the feeder link 560, each of which may associated with a longer delay than a terrestrial network.

As indicated above, FIG. 5 is provided as an example. Other examples may differ from what is described with regard to FIG. 5.

Figure 6:
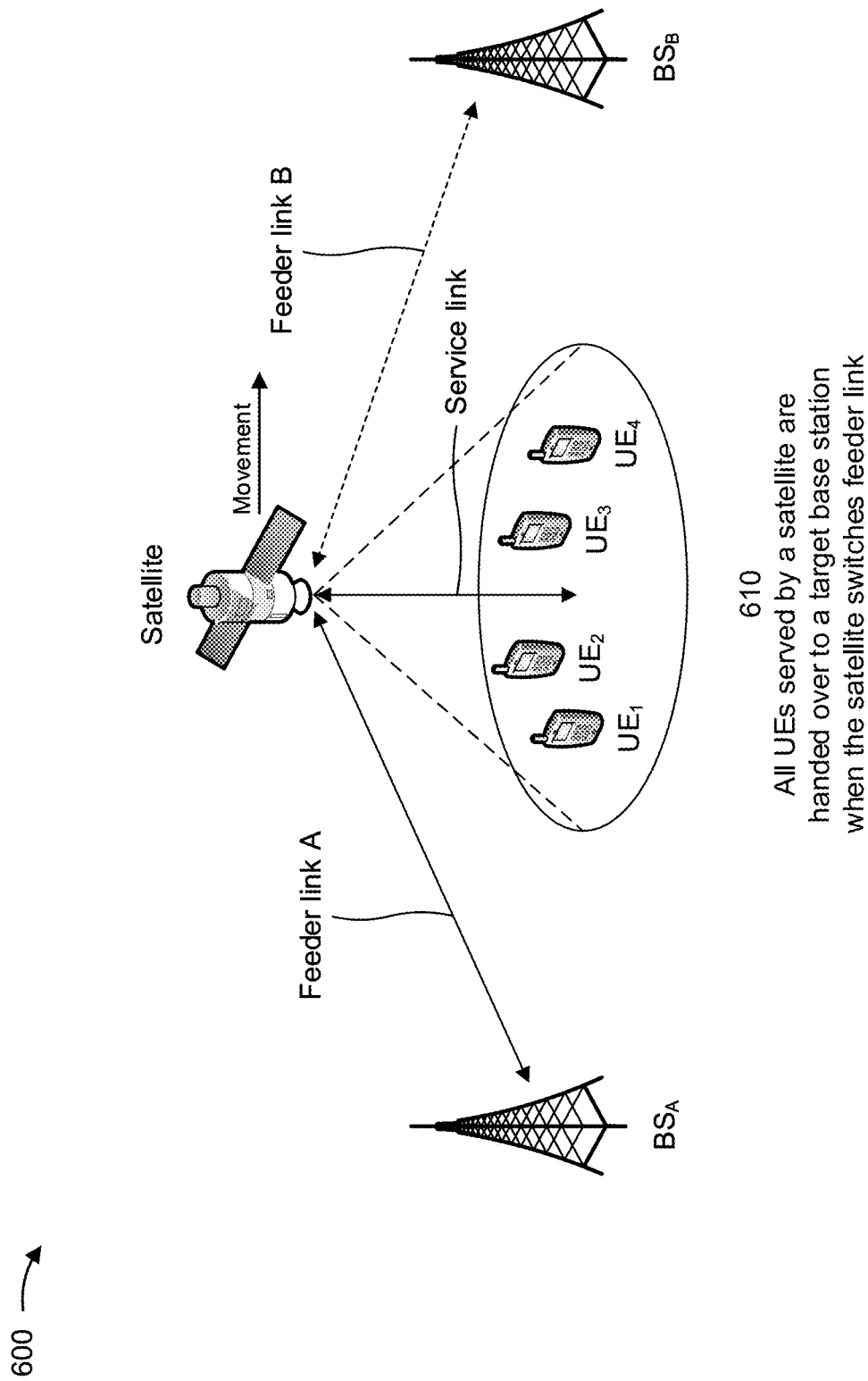
FIG. 6 is a diagram illustrating an example of a scenario in which congestion may occur in a target cell in an NTN due to multiple UEs attempting to initiate random access in the target cell.

FIG. 6 is a diagram illustrating an example 600 of a scenario in which congestion may occur in a target cell in an NTN due to multiple UEs attempting to initiate random access in the target cell. More particularly, in an NTN, there are various scenarios in which a UE may initiate a RACH procedure in a target cell in order to synchronize with the target cell and establish an initial RRC connection. For example, FIG. 6 illustrates a transparent deployment in which a satellite communicates with various UEs (shown as $UE_1$ through $UE_4$) in a cell provided by the satellite using a service link, and further in which the satellite communicates with a base station (e.g., a terrestrial base station located on the ground) using a feeder link. For example, in FIG. 6, the satellite may initially be communicating with a first base station (shown as $BS_A$) using a first feeder link (shown as feeder link A). Accordingly, the UEs located in the cell provided by the satellite may generally need to perform a two-step RACH procedure or a four-step RACH procedure to connect to the first base station associated with the active feeder link.

However, as the satellite moves, the satellite may need to switch the feeder link (e.g., because the serving base station associated with the active feeder link is out-of-coverage, out-of-range, and/or out-of-service, among other examples). For example, as shown in FIG. 6, the satellite may be moving away from the first base station and toward a second base station (shown as $BS_B$), whereby the satellite may need to connect to the second base station to switch the feeder link from the first base station to the second base station. Accordingly, as shown at 610, switching the feeder link from the first base station to the second base station may prompt a handover for all UEs located in the cell provided by the satellite. For example, after the satellite connects to the second base station and prior to switching the feeder link over to the second base station, the satellite may transmit a handover command to the UEs that are served by the satellite via the service link. As a result, all of the UEs served by the satellite may need to be handed over from the first base station to the second base station, which can result in significant congestion in the target cell provided by the second base station (e.g., when the satellite is serving a large number of UEs that need to be handed over to the target cell at or around the same time). In such cases, the congestion in the target cell may cause the RACH procedure to fail for one or more UEs attempting to connect to the target cell and/or degrade performance for one or more UEs that are connected to the target cell, among other examples.

Additionally, or alternatively, other scenarios may cause congestion to occur in the target cell due to many UEs initiating a RACH procedure at or around the same time. For example, in an NTN, one or more cells may be switched off or otherwise deactivated and a new cell may be activated to take over communication for the deactivated cell(s). In such cases, multiple UEs may attempt to connect to the target cell at or around the same time, for example, to perform an RRC reestablishment procedure in the target cell, transmit a handover completion message (e.g., an RRC reconfiguration complete message) to the target cell, and/or perform a registration update (e.g., when a gateway is switched and/or a tracking area or public land mobile network (PLMN) changes for UEs operating in an idle mode, among other examples). Accordingly, in cases where multiple UEs initiate a RACH procedure in a target cell at or around the same time, high congestion may occur in the target cell, which may result in RACH failure for one or more UEs attempting to connect (or reconnect) to the target cell and/or radio link failure (RLF) for one or more UEs that are connected to the target cell.

Some aspects described herein relate to techniques and apparatuses to dynamically control a time when a RACH procedure is performed in a target cell (e.g., when a handover command is executed because a source cell is switched off or a satellite needs to switch a feeder link from the source cell to the target cell, when an RRC reestablishment procedure is triggered for a UE communicating in the target cell, and/or a registration update is triggered due to a tracking area update and/or a change to a gateway or PLMN for UEs operating in idle mode). For example, as described in further detail herein, a UE may receive information (e.g., UE-specific, group-specific, and/or cell-specific signaling) that configures a target cell monitoring window in an NTN, and the UE may monitor a control channel for a control signal from the target cell during the target cell monitoring window prior to initiating a RACH procedure in the target cell. For example, in some aspects, the control signal may include a DCI indication (e.g., a PDCCH order) to dynamically indicate one or more UEs (e.g., a group of UEs) that are allowed to initiate random access, whereby a UE is not permitted to autonomously start a contention-based RACH procedure in the target cell during the target cell monitoring window unless the UE has received the control signal indicating that the UE is allowed to initiate random access. In this way, the target cell may regulate a rate at which UEs initiate the RACH procedure in order to manage congestion in the target cell. Furthermore, in cases where the UE does not receive the control signal during the target cell monitoring window, the UE may be permitted to autonomously initiate random access after the target cell monitoring window has expired. Additionally, or alternatively, a UE that is provided with a contention-free PRACH resource (e.g., prior to or during the target cell monitoring window) may ignore the target cell monitoring window and initiate a RACH procedure at any suitable time using the contention-free PRACH resource.

As indicated above, FIG. 6 is provided as an example. Other examples may differ from what is described with regard to FIG. 6.

Figure 7B:
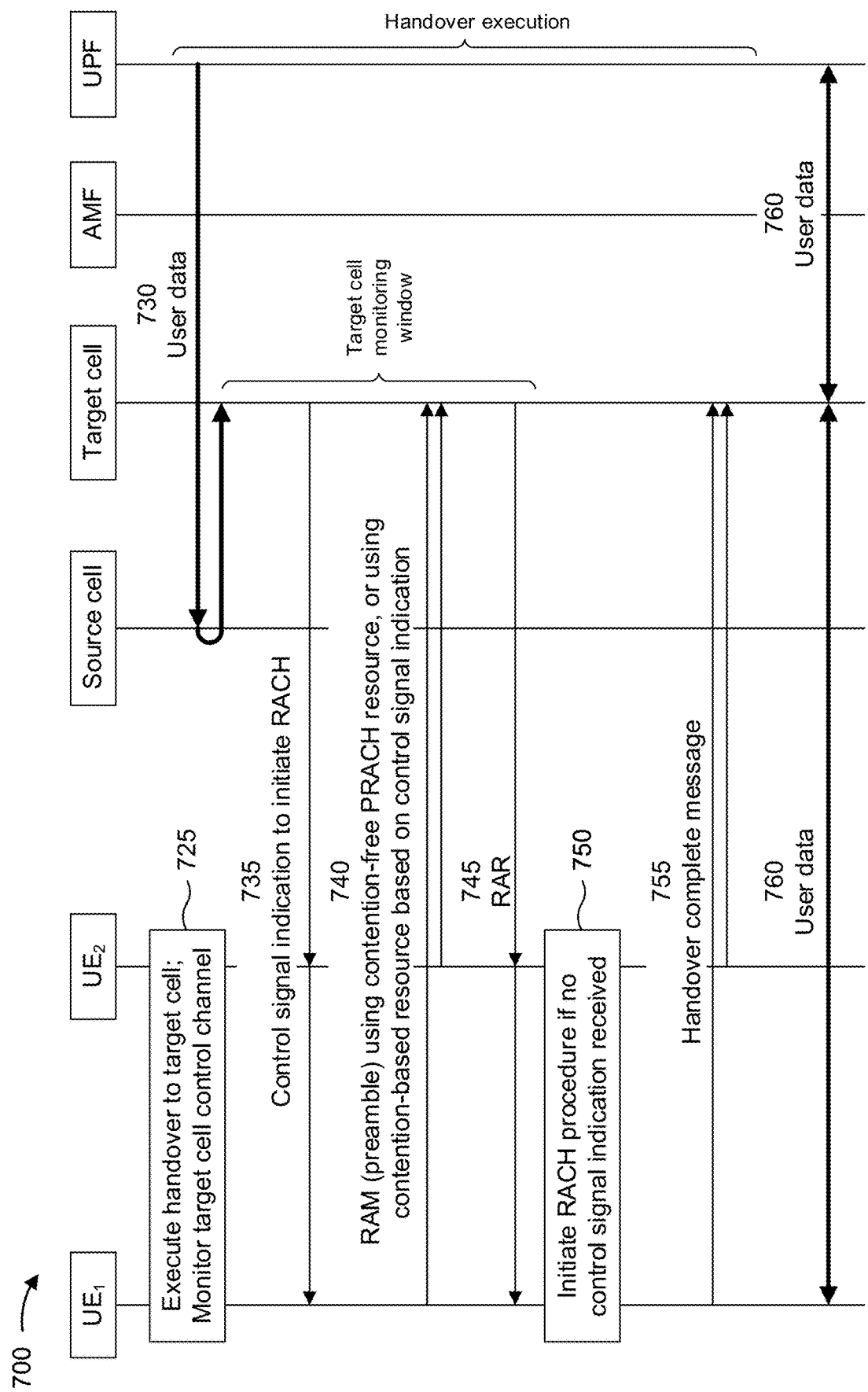

FIGS. 7A-7B are diagrams illustrating examples 700 associated with initiating random access in a target cell in an NTN. As shown in FIGS. 7A-7B, examples 700 include one or more UEs (shown as $UE_1$ and $UE_2$) that may communicate in an NTN, a source cell and a target cell that may be provided by respective base stations in the NTN, and one or more core network devices (e.g., an access and mobility management function (AMF) that terminates non-access stratum signaling performs mobility management, access authentication, and security context management, and a user plane function (UPF) that supports packet routing, packet inspection, and/or provides an anchor point for intra-RAT and/or inter-RAT mobility). In some aspects, the one or more UEs communicate with a satellite (not explicitly shown) that has a regenerative deployment or a transparent deployment, as described in further detail above with reference to FIG. 5 (e.g., the satellite may include a base station that provides the source cell and/or the target cell, or the satellite may communicate with one or more base stations that provide the source cell and/or the target cell via a feeder link). In some aspects, as described herein, the target cell may be a neighbor cell for one or more UEs (e.g., in cases where the source cell is a current serving cell for a UE and a handover is triggered for the UE from the source cell to the target cell), or the target cell may be a current serving cell for one or more UEs (e.g., in cases where an RRC reestablishment procedure or registration update is triggered while a UE is communicating with the target cell).

As shown in FIG. 7A, at 705, one or more UEs may receive information that configures a target cell monitoring window. For example, the target cell monitoring window may be configured in cell-specific signaling (e.g., a SIB broadcasted or otherwise transmitted by the source cell and/or the target cell), in UE-specific signaling (e.g., in a dedicated RRC message transmitted by the source cell and/or the target cell, such as an RRC reconfiguration message, or in a handover command message transmitted by the source cell to trigger a handover to the target cell), and/or in group-specific signaling (e.g., signaling addressed to a group of UEs based on location, UE identifiers, UE capabilities, and/or other suitable criteria). In some aspects, the information that configures the target cell monitoring window may indicate a start time and/or a length of the target cell monitoring window.

In some aspects, as described herein, the target cell monitoring window may include a period of time during which a UE is not permitted to autonomously initiate a contention-based RACH procedure in the target cell unless the UE has received, on a control channel from the target cell, a control signal that enables the UE to initiate the contention-based RACH procedure. Accordingly, in cases where the UE detects one or more events that trigger a contention-based RACH procedure in the target cell, the UE may need to monitor the control channel from the target cell for the control signal before initiating a contention-based RACH procedure. In some aspects, the information that configures the target cell monitoring window may therefore include information to enable the UEs to monitor the control channel (e.g., a PDCCH) from the target cell. For example, in cases where the information configuring the target cell monitoring window is provided in UE-specific or group-specific signaling (e.g., in a dedicated or group-specific RRC message or a dedicated or group-specific handover command), the configuration information may indicate a UE-specific or group-specific search space configuration to use to monitor the PDCCH from the target cell for the control signal. Additionally, or alternatively, in cases where the information configuring the target cell monitoring window is provided in cell-specific signaling (e.g., a SIB), the configuration information may indicate a common search space (CSS) configuration to use to monitor the PDCCH from the target cell (e.g., a CSS configuration associated with a radio network temporary identity (RNTI), a group-specific RNTI, and/or another suitable RNTI).

In some aspects, as described herein, there are various scenarios in which a UE may initiate a RACH procedure in the target cell. For example, in some aspects, the UE may be communicating with the source cell, and may receive a handover command that triggers a handover to the target cell (e.g., due to a satellite in a transparent deployment moving away from the source cell and toward the target cell and/or due to the source cell being switched off or otherwise deactivated). In another example, a UE may be communicating with the target cell and may initiate a RACH procedure when an RRC reestablishment procedure is triggered (e.g., to reestablish an RRC connection with the target cell due to a radio link with the target cell failing, a cell handover failing, and/or an RRC reconfiguration failing). In additional examples, the RACH procedure may be triggered by a registration update for UEs in an idle mode (e.g., a tracking area update, a gateway switch, a PLMN update, and/or another change in parameters that triggers a registration update in the target cell) and/or when a UE needs to initiate an uplink data transmission from an idle mode, among other examples. Accordingly, because there are various scenarios in which a UE may initiate a RACH procedure in the target cell, the information configuring the target cell monitoring window may indicate one or more scenarios for which the target cell monitoring window is enabled. For example, in some aspects, the target cell monitoring window may be enabled only during a handover to the target cell, only after RLF, only after a source cell has been turned off or otherwise deactivated, and/or for any suitable event or combination of events that may trigger a RACH procedure in the target cell. In some aspects, the one or more scenarios for which the target cell monitoring window is enabled may be indicated in UE-specific or group-specific signaling (e.g., an RRC message or handover command) or in cell-specific signaling (e.g., a SIB).

As further shown in FIG. 7A, at 710, one or more UEs may detect one or more events that trigger a RACH procedure in the target cell. For example, a UE may be communicating with the source cell, and may receive a handover command from the source cell that triggers a handover to the target cell. In another example, a UE may be communicating with the target cell and may detect one or more conditions that trigger an RRC reestablishment procedure (e.g., RLF with the target cell, a cell handover failure, and/or an RRC reconfiguration failure). In additional examples, a UE may be camping on the target cell in an idle mode and may detect a registration update triggered by a tracking area update, a gateway switch, a PLMN update, and/or another change in parameters in the target cell, or the UE may detect that uplink data is available to transmit while the UE is operating in an idle mode.

As further shown in FIG. 7A, at 715, the one or more UEs that detect one or more events that trigger a RACH procedure in the target cell may determine whether the target cell monitoring window is enabled for the triggering event(s). For example, as described above, the information configuring the target cell monitoring window may indicate one or more scenarios (and/or combinations of scenarios) in which the target cell monitoring window is enabled. In some aspects, in cases where the target cell monitoring window is not enabled for the event(s) triggering the RACH procedure for one or more UEs, such UEs may autonomously initiate a contention-based RACH procedure in the target cell (e.g., in a suitable RACH occasion) without having to first monitor the PDCCH from the target cell for the control signal. For example, in cases where the target cell monitoring window is not enabled for the event(s) triggering the RACH procedure, a UE may autonomously transmit a random access message that includes a preamble to initiate a two-step or four-step contention-based RACH procedure, which are described in more detail above in connection with FIG. 3 and FIG. 4. Additionally, or alternatively, a UE that has been configured with a contention-free PRACH resource may use the contention-free PRACH resource to transmit a random access message that includes a preamble to initiate a contention-free RACH procedure in the target cell without having to monitor the PDCCH from the target cell for the control signal.

Otherwise, in cases where the target cell monitoring window is enabled for the event(s) triggering the RACH procedure and a UE has not been configured with a contention-free PRACH resource, the UE is not allowed to autonomously initiate a contention-based RACH procedure. In such cases, as shown at 720, the UE may monitor the PDCCH from the target cell for a control signal before initiating a contention-based RACH procedure in the target cell. For example, in some aspects, the control signal may be provided in a DCI message (e.g., a UE-specific DCI message or a group common DCI message), which may include an indication (e.g., a PDCCH order) that indicates one or more UEs and/or groups of UEs that are allowed to initiate a RACH procedure in the target cell. In some aspects, the control signal may activate one or more reserved resources (e.g., resources in a time domain, a frequency domain, and/or a spatial domain) that can be used to transmit a random access message that includes a preamble (e.g., a msgA preamble in a two-step RACH procedure or a msg1 preamble in a four-step RACH procedure). In some aspects, after a UE has received the DCI message that includes the indication that the UE can initiate a RACH procedure in the target cell, the UE may transmit the random access message to initiate the RACH procedure in a suitable RACH occasion. Alternatively, if a UE does not receive the indication that the UE can initiate a RACH procedure in the target cell, the UE may continue to monitor the PDCCH from the target cell for the control signal that includes the indication. In some aspects, in cases where the UE does not receive the indication during the target cell monitoring window, the UE may autonomously transmit the random access message to initiate the RACH procedure in any suitable RACH occasion after the target cell monitoring window has expired. Alternatively, the UE may cease to monitor the PDCCH from the target cell and transmit the random access message to start the RACH procedure if the target cell configures a contention-free PRACH resource for the UE during the target cell monitoring window. Additionally, or alternatively, the target cell may configure a value of a backoff window that one or more UEs are to use to take a random backoff (e.g., when transmitting the random access message using the contention-free PRACH resource or a reserved resource that is activated by the control signal carried on the PDCCH).

FIG. 7B illustrates an example associated with initiating a RACH procedure in a target cell in connection with executing a handover from a source cell to a target cell. For example, as shown at 725, one or more UEs may execute a handover command received from a source cell, and the one or more UEs may monitor the PDCCH from the target cell for a control signal during a target cell monitoring window based on determining that the target cell monitoring window is enabled, valid, or otherwise applicable to a handover scenario. As shown at 730, a UPF may serve user data associated with the one or more UEs to the current source cell, and after handover execution begins, the user data associated with the one or more UEs executing the handover may be forwarded from the source cell to the target cell (e.g., to ensure service continuity after the handover). As shown, during the target cell monitoring window, the one or more UEs may monitor the PDCCH from the target cell for a control signal that indicates that the one or more UEs are permitted to initiate a contention-based RACH procedure.

Accordingly, the UE may need to determine a start time and a length for the target cell monitoring window during which the UE is to monitor the PDCCH from the target cell prior to initiating the RACH procedure in the target cell.

For example, in some aspects, the start time and length for the target cell monitoring window may be indicated in the handover command. Additionally, or alternatively, in cases where the handover command is a time-based conditional handover, the time-based conditional handover may be associated with an executable time (e.g., a time when the handover can be executed) or a validity time (e.g., a time range between a first time and a second time, during which time the time-based conditional handover is considered valid). In such cases, the target cell monitoring window may start after the executable time of the time-based conditional handover or after the validity time of the time-based conditional handover. Alternatively, in some aspects, the validity time of the time-based conditional handover may be used as the target cell monitoring window. Additionally, or alternatively, in cases where the handover command is a location-based conditional handover, one or more location-based conditions may be defined such that the UE cannot execute the handover command until the one or more conditions are satisfied. For example, the location-based conditional handover may define a UE-to-beam-center distance condition and/or a UE-to-satellite distance condition. In such cases, the target cell monitoring window may start after the UE satisfies the UE-to-beam-center distance condition, the UE-to-satellite distance condition, and/or another suitable condition. In another example, the UE(s) may receive the handover command from the source cell in a particular slot, and the target cell monitoring window may be defined to start in an earliest PDCCH occasion of the target cell after an RRC processing time (e.g., 10 milliseconds). In still another example, the start time of the target cell monitoring window may be based on a broadcasted time value (e.g., a cell switch-off time, a gateway switch time, or a tracking area code (TAC) update time). For example, given a configured length for the target cell monitoring window, the start of the target cell monitoring window may be defined as the difference between the broadcasted time value and the window length. Alternatively, the start of the target cell monitoring window may be defined as the broadcasted time value (e.g., before the source cell switches off, the UE may initiate the RACH procedure in the target cell, but after the source cell has switched off, the UE may have to monitor the PDCCH from the target cell for the appropriate control signal before initiating the RACH procedure in the target cell).

As further shown in FIG. 7B, at 735, the target cell may transmit, and the one or more UEs may receive, the control signal indicating that the one or more UEs may initiate a RACH procedure in the target cell during the target cell monitoring window. For example, as described above, the control signal may include a DCI message that carries an indication to activate reserved resources in the target cell and allow a UE or a group of UEs to initiate a RACH procedure using the activated resources. Accordingly, as shown at 740, the UEs may transmit a random access message that includes a preamble to initiate the RACH procedure based on receiving the control signal during the target cell monitoring window. Alternatively, as shown, one or more UEs may transmit the random access message using a contention-free PRACH resource at any suitable time during the target cell monitoring window based on the target cell configuring a contention-free PRACH resource (e.g., before or during the target cell monitoring window). As further shown, at 745, the target cell may transmit a random access response to the UEs that initiated the RACH procedure, as described in more detail above in connection with FIGS. 3-4. Alternatively, as shown at 755, a UE that is not configured with a contention-free PRACH resource may initiate the RACH procedure after the target cell monitoring window has expired if the UE does not receive the appropriate control signal during the target cell monitoring window. As shown at 755, the UEs may transmit a handover complete message to the target cell after successfully completing the RACH procedure. As shown at 760, the UPF may then serve user data associated with the UEs to the target cell, and the target cell may serve the user data to the UEs following the handover.

As indicated above, FIGS. 7A-7B are provided as examples. Other examples may differ from what is described with regard to FIGS. 7A-7B.

FIG. 8 is a flowchart of an example method 800 of wireless communication. The method 800 may be performed by, for example, a UE (e.g., UE 120).

At 810, the UE may receive information configuring a target cell monitoring window in an NTN. For example, the UE (e.g., using communication manager 140 and/or reception component 902, depicted in FIG. 9) may receive information configuring a target cell monitoring window in an NTN, as described above in connection with, for example, FIG. 7A at 705. In some aspects, the information configuring the target cell monitoring window is received in a SIB. In some aspects, the information configuring the target cell monitoring window is received in a dedicated RRC message or a handover command triggering a handover to the target cell. In some aspects, the information configuring the target cell monitoring window indicates a search space configuration for monitoring the control channel from the target cell. In some aspects, the information configuring the target cell monitoring window indicates whether the target cell monitoring window is enabled or disabled in one or more scenarios that trigger the RACH procedure in the target cell. In some aspects, the information configuring the target cell monitoring window includes one or more of a start time or a length for the target cell monitoring window.

At 820, the UE may detect one or more events that trigger a RACH procedure in a target cell in the NTN. For example, the UE (e.g., using communication manager 140 and/or detection component 908, depicted in FIG. 9) may detect one or more events that trigger a RACH procedure in a target cell in the NTN, as described above in connection with, for example, FIG. 7A at 710. In some aspects, the one or more events that trigger the RACH procedure include an event that triggers a radio resource control reestablishment procedure in the target cell. In some aspects, the one or more events that trigger the RACH procedure include receiving a command to execute a handover to the target cell. In some aspects, the one or more events that trigger the RACH procedure include an event that triggers a registration update in the target cell. In some aspects, the one or more events that trigger the RACH procedure include detecting that an uplink data transmission is available while the UE is in an idle mode.

At 830, the UE may monitor a control channel from the target cell for a control signal that includes an indication to initiate the RACH procedure in the target cell, wherein the control channel is monitored based at least in part on detecting the one or more events that trigger the RACH procedure in the target cell. For example, the UE (e.g., using communication manager 140 and/or monitoring component 910, depicted in FIG. 9) may monitor a control channel from the target cell for a control signal that includes an indication to initiate the RACH procedure in the target cell, wherein the control channel is monitored based at least in part on detecting the one or more events that trigger the RACH procedure in the target cell, as described above in connection with, for example, FIG. 7A at 715, 720. In some aspects, the control signal includes DCI that activates one or more resources in the target cell that are reserved for initiating the RACH procedure by the UE or UEs in a UE group that includes the UE. In some aspects, the target cell monitoring window starts after an executable time or a validity time associated with a time-based conditional handover. In some aspects, the target cell monitoring window includes a validity time range associated with a time-based conditional handover. In some aspects, the target cell monitoring window starts after one or more conditions associated with a location-based conditional handover are satisfied. In some aspects, the target cell monitoring window starts in an earliest control channel occasion that is at least an RRC processing time after a slot in which a handover command is received from a source cell. In some aspects, the target cell monitoring window has a start time that is based at least in part on one or more of a cell switch off time, a gateway switch time, or a TAC update time.

At 840, the UE may transmit a random access message that includes a preamble to initiate the RACH procedure in the target cell, wherein the random access message is transmitted at a time that is based at least in part on a status associated with the control signal. For example, the UE (e.g., using communication manager 140 and/or transmission component 904, depicted in FIG. 9) may transmit a random access message that includes a preamble to initiate the RACH procedure in the target cell, wherein the random access message is transmitted at a time that is based at least in part on a status associated with the control signal, as described above in connection with, for example, FIG. 7B at 740.

In some aspects, method 800 includes receiving, on the control channel during the target cell monitoring window, the control signal that includes the indication to initiate the RACH procedure, wherein the random access message is transmitted during the target cell monitoring window based at least in part on receiving the control signal.

In some aspects, the random access message is transmitted after the target cell monitoring window has expired based at least in part on determining that the control signal was not received during the target cell monitoring window.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
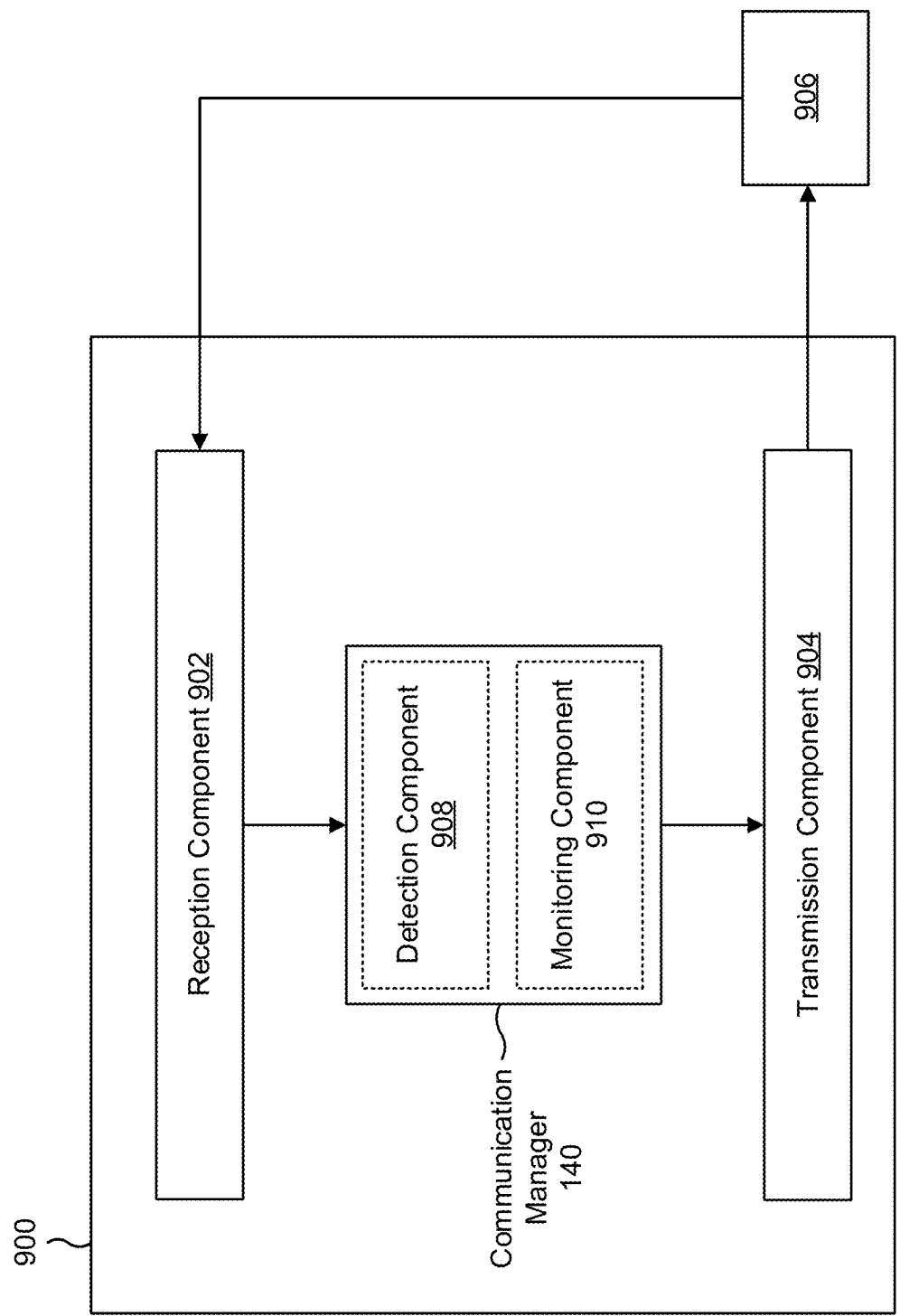
FIG. 9 is a diagram of an example apparatus for wireless communication.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a detection component 908 or a monitoring component 910, among other examples.

In some aspects, the apparatus 900 may be configured to perform one or more operations described herein in connection with FIGS. 7A-7B. Additionally, or alternatively, the apparatus 900 may be configured to perform one or more methods described herein, such as method 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive information configuring a target cell monitoring window in an NTN. The detection component 908 may detect one or more events that trigger a RACH procedure in a target cell in the NTN. The monitoring component 910 may monitor a control channel from the target cell for a control signal that includes an indication to initiate the RACH procedure in the target cell, wherein the control channel is monitored based at least in part on detecting the one or more events that trigger the RACH procedure in the target cell. The transmission component 904 may transmit a random access message that includes a preamble to initiate the RACH procedure in the target cell, wherein the random access message is transmitted at a time that is based at least in part on a status associated with the control signal.

The reception component 902 may receive, on the control channel during the target cell monitoring window, the control signal that includes the indication to initiate the RACH procedure, wherein the random access message is transmitted during the target cell monitoring window based at least in part on receiving the control signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
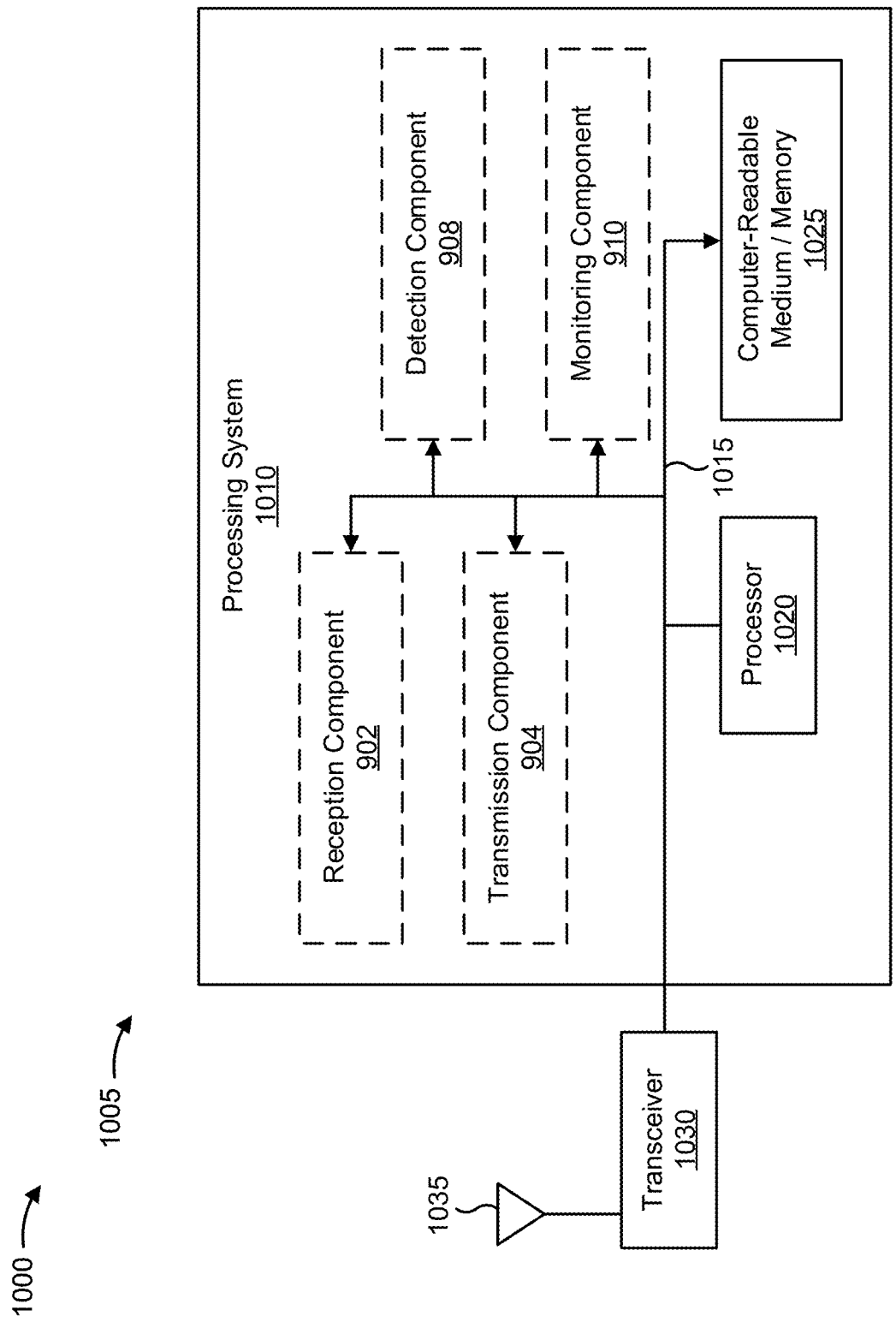
FIG. 10 is a diagram illustrating an example of a hardware implementation for an apparatus employing a processing system.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving information configuring a target cell monitoring window in an NTN, means for detecting one or more events that trigger a RACH procedure in a target cell in the NTN, means for monitoring a control channel from the target cell for a control signal that includes an indication to initiate the RACH procedure in the target cell, wherein the control channel is monitored based at least in part on detecting the one or more events that trigger the RACH procedure in the target cell, and means for transmitting a random access message that includes a preamble to initiate the RACH procedure in the target cell, wherein the random access message is transmitted at a time that is based at least in part on a status associated with the control signal. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

The following provides an overview of some Aspects of the present disclosure:

Aspect 1: A method of wireless communication performed by a UE, comprising: receiving information configuring a target cell monitoring window in an NTN; detecting one or more events that trigger a RACH procedure in a target cell in the NTN; monitoring a control channel from the target cell for a control signal that includes an indication to initiate the RACH procedure in the target cell, wherein the control channel is monitored based at least in part on detecting the one or more events that trigger the RACH procedure in the target cell; and transmitting a random access message that includes a preamble to initiate the RACH procedure in the target cell, wherein the random access message is transmitted at a time that is based at least in part on a status associated with the control signal.

Aspect 2: The method of Aspect 1, further comprising: receiving, on the control channel during the target cell monitoring window, the control signal that includes the indication to initiate the RACH procedure, wherein the random access message is transmitted during the target cell monitoring window based at least in part on receiving the control signal.

Aspect 3: The method of any of Aspects 1-2, wherein the control signal includes DCI that activates one or more resources in the target cell that are reserved for initiating the RACH procedure by the UE or UEs in a UE group that includes the UE.

Aspect 4: The method of Aspect 1, wherein the random access message is transmitted after the target cell monitoring window has expired based at least in part on determining that the control signal was not received during the target cell monitoring window.

Aspect 5: The method of any of Aspects 1-4, wherein the information configuring the target cell monitoring window is received in a SIB.

Aspect 6: The method of any of Aspects 1-4, wherein the information configuring the target cell monitoring window is received in a dedicated RRC message or a handover command triggering a handover to the target cell.

Aspect 7: The method of any of Aspects 1-6, wherein the information configuring the target cell monitoring window indicates a search space configuration for monitoring the control channel from the target cell.

Aspect 8: The method of any of Aspects 1-7, wherein the information configuring the target cell monitoring window indicates whether the target cell monitoring window is enabled or disabled in one or more scenarios that trigger the RACH procedure in the target cell.

Aspect 9: The method of any of Aspects 1-8, wherein the information configuring the target cell monitoring window includes one or more of a start time or a length for the target cell monitoring window.

Aspect 10: The method of any of Aspects 1-8, wherein the target cell monitoring window starts after an executable time or a validity time associated with a time-based conditional handover.

Aspect 11: The method of any of Aspects 1-8, wherein the target cell monitoring window includes a validity time range associated with a time-based conditional handover.

Aspect 12: The method of any of Aspects 1-8, wherein the target cell monitoring window starts after one or more conditions associated with a location-based conditional handover are satisfied.

Aspect 13: The method of any of Aspects 1-8, wherein the target cell monitoring window starts in an earliest control channel occasion that is at least an RRC processing time after a slot in which a handover command is received from a source cell.

Aspect 14: The method of any of Aspects 1-8, wherein the target cell monitoring window has a start time that is based at least in part on one or more of a cell switch off time, a gateway switch time, or a tracking area code update time.

Aspect 15: The method of any of Aspects 1-14, wherein the one or more events that trigger the RACH procedure include an event that triggers an RRC reestablishment procedure in the target cell.

Aspect 16: The method of any of Aspects 1-15, wherein the one or more events that trigger the RACH procedure include receiving a command to execute a handover to the target cell.

Aspect 17: The method of any of Aspects 1-16, wherein the one or more events that trigger the RACH procedure include an event that triggers a registration update in the target cell.

Aspect 18: The method of any of Aspects 1-17, wherein the one or more events that trigger the RACH procedure include detecting that an uplink data transmission is available while the UE is in an idle mode.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving information configuring a target cell monitoring window in a non-terrestrial network (NTN), wherein the target cell monitoring window is associated with a period of time for monitoring a control channel from the target cell for a control signal that includes an indication to initiate a random access channel (RACH) procedure in the target cell;
    detecting one or more events that trigger the RACH procedure in a target cell in the NTN;
    monitoring the control channel from the target cell for the control signal based at least in part on detecting the one or more events that trigger the RACH procedure in the target cell; and
    transmitting a random access message that includes a preamble to initiate the RACH procedure in the target cell, wherein the random access message is transmitted at a time that is based at least in part on a status associated with the control signal.

2. The method of claim 1, further comprising:
    receiving, on the control channel during the target cell monitoring window, the control signal that includes the indication to initiate the RACH procedure, wherein the random access message is transmitted during the target cell monitoring window based at least in part on receiving the control signal.

3. The method of claim 1, wherein the control signal includes downlink control information that activates one or more resources in the target cell that are reserved for initiating the RACH procedure by the UE or UEs in a UE group that includes the UE.

4. The method of claim 1, wherein the random access message is transmitted after the target cell monitoring window has expired based at least in part on determining that the control signal was not received during the target cell monitoring window.

5. The method of claim 1, wherein the information configuring the target cell monitoring window is received in a system information block, a dedicated radio resource control message, or a handover command triggering a handover to the target cell.

6. The method of claim 1, wherein the information configuring the target cell monitoring window indicates a search space configuration for monitoring the control channel from the target cell.

7. The method of claim 1, wherein the information configuring the target cell monitoring window indicates whether the target cell monitoring window is enabled or disabled in one or more scenarios that trigger the RACH procedure in the target cell.

8. The method of claim 1, wherein the information configuring the target cell monitoring window includes one or more of a start time for monitoring the control channel or the period of time for monitoring the control channel.

9. The method of claim 1, wherein the target cell monitoring window starts after an executable time or a validity time associated with a time-based conditional handover.

10. The method of claim 1, wherein the target cell monitoring window includes a validity time range associated with a time-based conditional handover.

11. The method of claim 1, wherein the target cell monitoring window starts after one or more conditions associated with a location-based conditional handover are satisfied.

12. The method of claim 1, wherein the target cell monitoring window starts in an earliest control channel occasion that is at least a radio resource control processing time after a slot in which a handover command is received from a source cell.

13. The method of claim 1, wherein the target cell monitoring window has a start time that is based at least in part on one or more of a cell switch off time, a gateway switch time, or a tracking area code update time.

14. The method of claim 1, wherein the one or more events that trigger the RACH procedure include an event that triggers a radio resource control reestablishment procedure in the target cell, receiving a command to execute a handover to the target cell, an event that triggers a registration update in the target cell, or detecting that an uplink data transmission is available while the UE is in an idle mode.

15. A user equipment (UE) for wireless communication, comprising:
a memory; and
one or more processors, coupled to the memory, configured to:
receive information configuring a target cell monitoring window in a non-terrestrial network (NTN), wherein the target cell monitoring window is associated with a period of time for monitoring a control channel from the target cell for a control signal that includes an indication to initiate a random access channel (RACH) procedure in the target cell;
detect one or more events that trigger the RACH procedure in a target cell in the NTN;
monitor the control channel from the target cell for the control signal based at least in part on detecting the one or more events that trigger the RACH procedure in the target cell; and
transmit a random access message that includes a preamble to initiate the RACH procedure in the target cell, wherein the random access message is transmitted at a time that is based at least in part on a status associated with the control signal.

16. The UE of claim 15, wherein the one or more processors are further configured to:
receive, on the control channel during the target cell monitoring window, the control signal that includes the indication to initiate the RACH procedure, wherein the random access message is transmitted during the target cell monitoring window based at least in part on receiving the control signal.

17. The UE of claim 15, wherein the control signal includes downlink control information that activates one or more resources in the target cell that are reserved for initiating the RACH procedure by the UE or UEs in a UE group that includes the UE.

18. The UE of claim 15, wherein the random access message is transmitted after the target cell monitoring window has expired based at least in part on determining that the control signal was not received during the target cell monitoring window.

19. The UE of claim 15, wherein the information configuring the target cell monitoring window is received in a system information block, a dedicated radio resource control message, or a handover command triggering a handover to the target cell.

20. The UE of claim 15, wherein the information configuring the target cell monitoring window indicates a search space configuration for monitoring the control channel from the target cell.

21. The UE of claim 15, wherein the information configuring the target cell monitoring window indicates whether the target cell monitoring window is enabled or disabled in one or more scenarios that trigger the RACH procedure in the target cell.

22. The UE of claim 15, wherein the information configuring the target cell monitoring window includes one or more of a start time for monitoring the control channel or the period of time for monitoring the control channel.

23. The UE of claim 15, wherein the target cell monitoring window starts after an executable time or a validity time associated with a time-based conditional handover.

24. The UE of claim 15, wherein the target cell monitoring window includes a validity time range associated with a time-based conditional handover.

25. The UE of claim 15, wherein the target cell monitoring window starts after one or more conditions associated with a location-based conditional handover are satisfied.

26. The UE of claim 15, wherein the target cell monitoring window starts in an earliest control channel occasion that is at least a radio resource control processing time after a slot in which a handover command is received from a source cell.

27. The UE of claim 15, wherein the target cell monitoring window has a start time that is based at least in part on one or more of a cell switch off time, a gateway switch time, or a tracking area code update time.

28. The UE of claim 15, wherein the one or more events that trigger the RACH procedure include one or more of an event that triggers a radio resource control reestablishment procedure in the target cell, receiving a command to execute a handover to the target cell, an event that triggers a registration update in the target cell, or detecting that an uplink data transmission is available while the UE is in an idle mode.

29. A non-transitory computer-readable medium storing a set of instructions for wireless communication, the set of instructions comprising:
one or more instructions that, when executed by one or more processors of a user equipment (UE), cause the UE to:
receive information configuring a target cell monitoring window in a non-terrestrial network (NTN);
detect one or more events that trigger a random access channel (RACH) procedure in a target cell in the NTN, wherein the target cell monitoring window is associated with a period of time for monitoring a control channel from the target cell for a control signal that includes an indication to initiate the RACH procedure in the target cell;

monitor the control channel from the target cell for the control signal based at least in part on detecting the one or more events that trigger the RACH procedure in the target cell; and transmit a random access message that includes a preamble to initiate the RACH procedure in the target cell, wherein the random access message is transmitted at a time that is based at least in part on a status associated with the control signal.

30. An apparatus for wireless communication, comprising:

means for receiving information configuring a target cell monitoring window in a non-terrestrial network (NTN), wherein the target cell monitoring window is associated with a period of time for monitoring a control channel from the target cell for a control signal that includes an indication to initiate a random access channel (RACH) procedure in the target cell;

means for detecting one or more events that trigger the RACH procedure in a target cell in the NTN;

means for monitoring the control channel from the target cell for the control signal based at least in part on detecting the one or more events that trigger the RACH procedure in the target cell; and means for transmitting a random access message that includes a preamble to initiate the RACH procedure in the target cell, wherein the random access message is transmitted at a time that is based at least in part on a status associated with the control signal.

\* \* \* \* \*